Nov. 1, 1966  H. P. BISHOP  3,283,093
PLASTIC INLET VALVE FOR CENTRAL VACUUM CLEANING SYSTEM
Filed April 27, 1965  3 Sheets-Sheet 1

INVENTOR
HAROLD P. BISHOP, DECEASED
BY MABEL G. BISHOP, EXECUTRIX
BY
Frease, Bishop, Johns & Schick
ATTORNEYS Nov. 1, 1966  H. P. BISHOP  3,283,093
PLASTIC INLET VALVE FOR CENTRAL VACUUM CLEANING SYSTEM
Filed April 27, 1965  3 Sheets-Sheet 2

INVENTOR
HAROLD P. BISHOP, DECEASED
BY MABEL G. BISHOP, EXECUTRIX

BY
Frease, Bishop, Johns & Schick
ATTORNEYS

INVENTOR
HAROLD P. BISHOP, DECEASED
BY MABEL G. BISHOP, EXECUTRIX
BY
Frease, Bishop, Johns & Schick
ATTORNEYS

United States Patent Office 3,283,093
Patented Nov. 1, 1966

3,283,093
PLASTIC INLET VALVE FOR CENTRAL
VACUUM CLEANING SYSTEM
Harold P. Bishop, deceased, late of Louisville, Ohio, by Mabel G. Bishop, executrix, 508 S. Mill St., Louisville, Ohio
Filed Apr. 27, 1965, Ser. No. 451,354
13 Claims. (Cl. 260—61.6)

The invention relates to inlet valves for built-in vacuum cleaning systems, and the like, and more particularly to such a device in which the valve body and the hinged lid therefor are formed of a flexible plastic material such as vinyl.

A primary object of the invention is to provide an inlet valve of the character referred to in which the parts may be molded from flexible plastic material and the body portion and lid may be hingedly connected together without requiring any additional hinge members of metal or other material.

Another object of the invention is to provide such an inlet valve in which the hinge parts are molded integrally upon the valve body and lid.

A further object of the invention is to provide an inlet valve of this character in which each hinge member is in the form of a circular series of radially disposed ratchet teeth, those on the lid being located upon flexible arms integral therewith.

A still further object of the invention is to provide an inlet valve of this type in which switch means is provided in the inlet valve whereby opening the lid to a predetermined degree will close a circuit to the vacuum machine, and opening the lid to a predetermined greater degree will open the circuit to the vacuum machine, whereby the tube system of the built-in vacuum cleaning system may be used for a speaking tube.

It is also an object of the invention to provide such an inlet valve in which the switch means is such that opening of the lid to about a 90° open position closes a high speed switch, opening of the lid to about a 135° open position closes a low speed switch, and opening the lid to about a 180° full open position opens the circuit.

Another object of the invention is to provide an inlet valve of the character referred to in which a plurality of spaced terminals are located within the body portion of the inlet valve, and a flexible vinyl slider member is pivotally connected to the lid and has a portion slidably located through a slot in the body portion and carrying a sliding contact for engaging different combinations of said terminals as the lid is opened.

A further object of the invention is to provide such an inlet valve in which a night light, a heat sensitive device and a push button may be located in the inlet valve body.

A still further object of the invention is to provide a novel type of wire retainers in the valve.

The above and other objects, apparent from the drawings and following description, may be attained, the above described difficulties overcome and the advantages and results obtained, by the apparatus, construction, arrangements and combinations, sub-combinations and parts which comprise the present invention, a preferred embodiment of which, illustrative of the best mode in which applicant has contemplated applying the principle, being set forth in detail in the following description and illustrated in the accompanying drawings, in which.

The inlet valve to which the invention pertains comprises the body portion 1 and the lid 2, both of which may be molded from a plastic material such as vinyl. The body portion 1 is of generally rectangular shape, the inner side thereof having flush upper and lower marginal portions 3 and 4 respectively, and side marginal portions 5, adapted to abut a side wall or the like.

Figure 10:
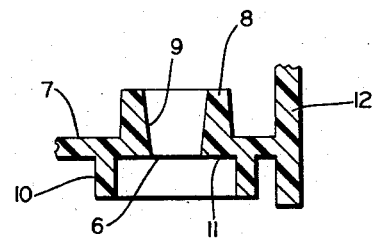
FIG. 10 is a detail section on the line 10—10, FIG. 4.

Diagonally disposed slots 6 are formed in the body portion 1, for receiving screws or the like, for attaching it to the wall. These slots are formed in the wall 7 of the body portion 1, and, as best shown in FIG. 10, an inwardly disposed, substantially oval flange 8 surrounds each slot 6 on the inner side of the wall 7.

Each flange 8 may be inwardly tapered, as indicated at 9. An outwardly disposed flange 10, spaced from the slot, is located on the outer side of the wall 7, providing a flat surface 11 therein for receiving the head of a screw or the like.

The inwardly disposed inlet tube 12 surrounds the central inlet opening 13, in the wall 7 of the body portion 1, and is adapted to be connected to suitable tubing by means of which similar inlet valves throughout a building may be connected to a centrally installed vacuum-producing apparatus, as is common in built-in vacuum cleaning systems.

Figure 9:
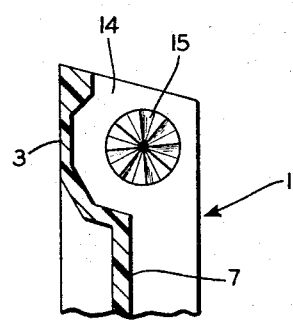
FIG. 9 is a fragmentary detail sectional view showing one of the hinge members on the body portion.

At the upper end of each side wall 14 of the body portion is formed a circular series of radially disposed, inwardly tapered, ratchet teeth 15 (FIG. 9). The lid 2 has the diverging integral arms 16 at its upper end with similar ratchet teeth arrangements 17 at the upper free ends thereof.

The vinyl plastic material from which the lid is made has a certain inherent resilience. The arms 16 of the lid, thus being resilient, are sprung inward toward each other at their upper ends, to permit the series of ratchet teeth 17 thereon to engage the corresponding series of ratchet teeth 17 on the side walls of the body portion.

This resilience of the arms 16 thus holds the lid hingedly engaged with the body portion and permits the lid to be opened or closed to any desired degree, the ratchet teeth 17 and 15 of the lid and body portion, respectively, clicking over each other as the lid 7 is opened or closed, and temporarily holding the lid in the desired adjusted position.

Figure 1:
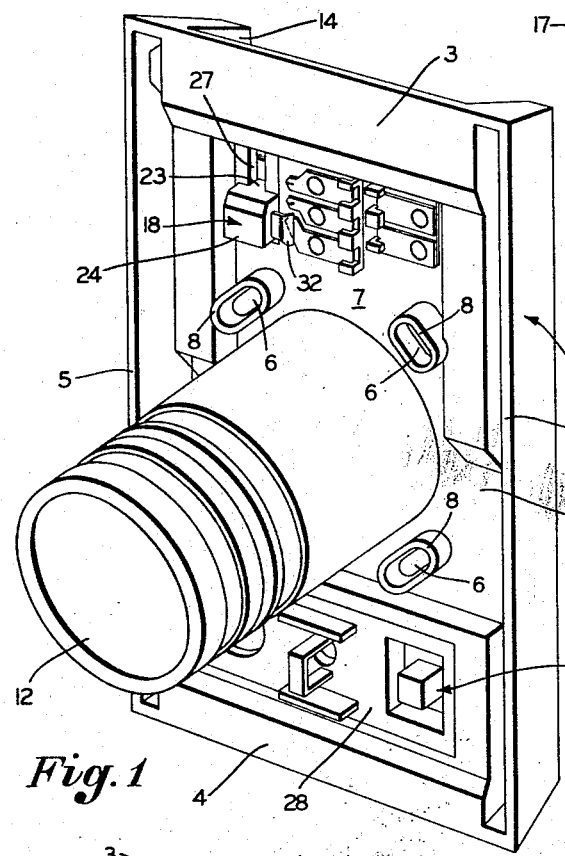
FIG. 1 is a perspective view of the inner side of the body portion of an inlet valve embodying the invention.
Figure 2:
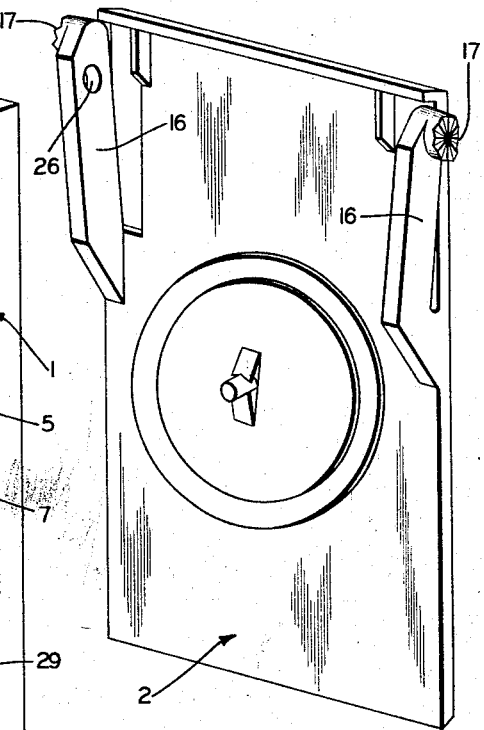
FIG. 2 is a perspective view of the inner side of the lid for the inlet valve, showing the same detached from the body portion of the valve.
Figure 3:
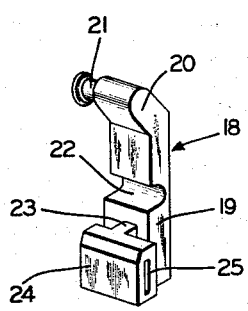
FIG. 3 is a detached perspective view of the flexible plastic slider.

Reference is now made to the slider member 18 shown in detail in FIG. 3. This member is molded of flexible plastic material such as vinyl, and comprises the elongated vertically disposed body portion 19 with angular upper end 20 having headed stud 21 at one side thereof.

The body 19 is transversely reduced in thickness at a point near its center by the transversely disposed groove 22. At the lower end of the body 19 of the slider member is formed an inwardly disposed reduced neck 23 with substantially rectangular head 24 at its inner end. The head 24 has a slot 25 in one end for a purpose to be later described.

In assembling the slider 18 to the inlet valve, the headed stud 21 is snapped into the aperture 26 formed in one of the resilient arms 16 of the lid, so that the slider 18 may pivot upon said stud. The reduced neck 23 is slidably received within the vertical slot 27 in the wall 7 of the body portion 1 of the inlet valve.

In the lower part of the body portion 1 of the inlet valve is a panel 28, which may be inserted therein, and upon which may be mounted a push button device indicated generally at 29, a night light indicated generally at 30, and a heat sensitive device, which may be of the type sold under the trademark "Therm-O-Disc," indicated generally at 31.

A sliding contact 32 is provided with a shank inserted into the slot 25 in the rectangular head 24 of the flexible slider 18, and, as shown in FIGS. 1 and 4–8, is adapted to selectively engage different combinations of three terminals upon the inner side of the wall 7 of the body portion 1 of the inlet valve.

Two wire retainers, not engaged by the sliding contact 32, are also provided upon the inner side of the wall 7 to complete the wiring to the push button, night light and heat sensitive device and to the motor of the suction apparatus.

Figure 4:
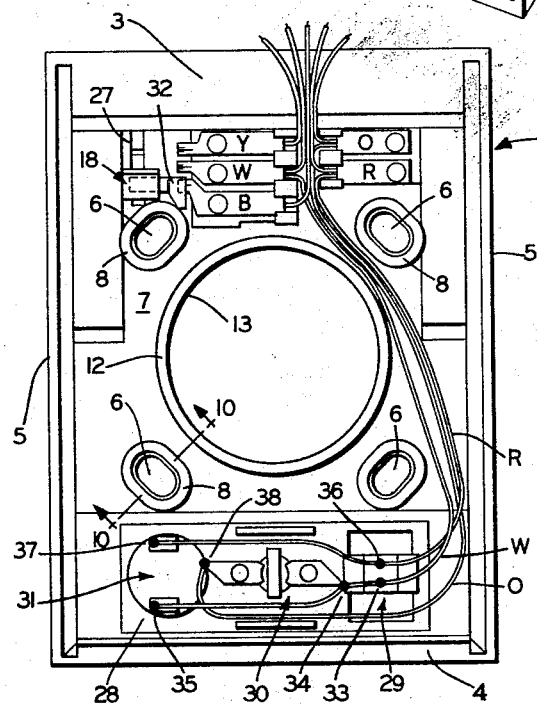
FIG. 4 is an elevation of the inner side of the body portion of the inlet valve, showing the wiring to the several terminals, wire retainers, push button, night light and heat sensitive device.
Figure 12:
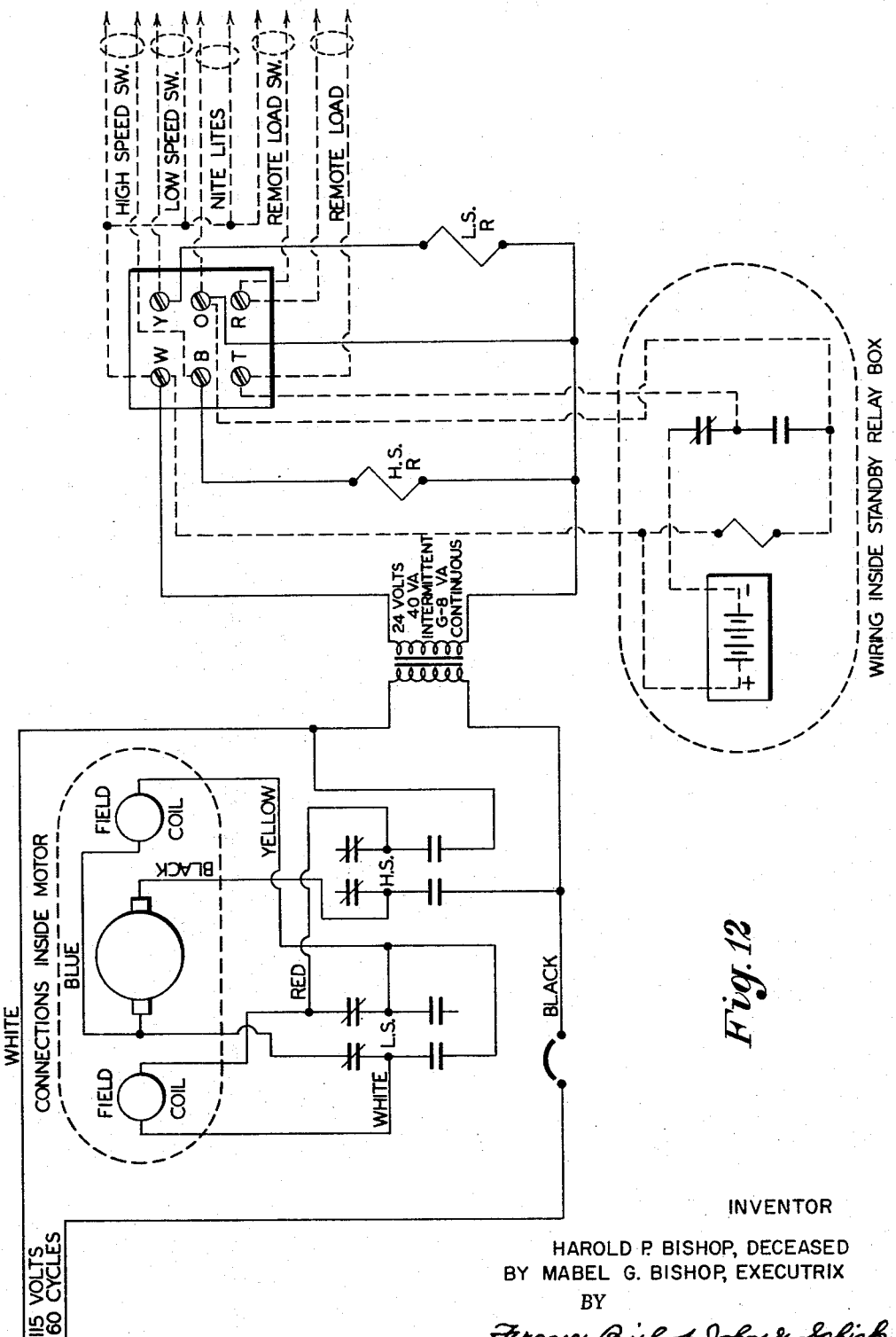
FIG. 12 is a schematic wiring diagram.

For the purpose of clarity, different wires in the schematic diagram (FIG. 12) are indicated by color rather than by reference numerals. In FIG. 4 the initials of the several colors are used to indicate the several wires and the same initials are used to indicate the terminals and wire retainers to which the several wires are connected.

Thus, as shown in FIG. 4, the yellow wire is connected to the upper terminal Y. The white wire is connected to the intermediate terminal W and then connects to the push button 29 at 33, to the night light 30 at 34, and to the "Therm-O-Disc" 31 at 35. The black wire is connected to the lower terminal B. The red wire is connected to the lower terminal R and then to the push button 29 at 36, and to the "Therm-O-Disc" 31 at 37. The orange wire is connected to the upper retainer O and then to the night light 30 at 38.

Figure 11:
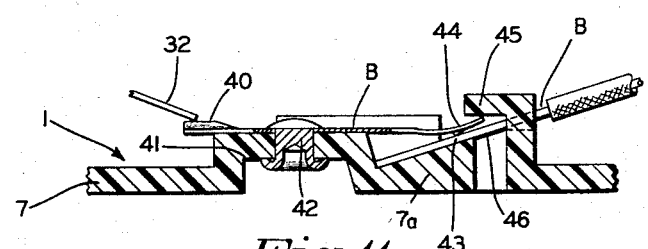
FIG. 11 is an enlarged fragmentary sectional view showing the method of retaining wire in the terminals, etc.

For the purpose of making electrical contact between the several wires and each of the terminals or retainers, each wire may be attached to the corresponding terminal or retainer as shown in FIG. 11, which is an enlarged sectional elevation of the terminal B showing the connection of the wire B thereto.

It will be seen that the terminal is formed of sheet metal having a raised contact portion 40 at one end for engagement by the sliding contact 32. The terminal is attached to the raised portion 41 of the wall 7 as by the rivet 42.

At the other end of the terminal a barb 43 is stamped from the upwardly curved end portion 44 of the terminal, which is engaged by the overhanging flange 45. The downwardly disposed barb 43 bites into the bare wire, indicated at 46, making contact therewith and clamping the wire against the inclined portion 7a of the wall.

In the operation of the device, as the lid 2 is opened to various degrees the slider 18 will flex at the reduced point 22, and the head 24 thereof will slide up and down moving the sliding contact 32 thereof into selective engagement with different combinations of the terminals Y, W and B.

Figure 5:
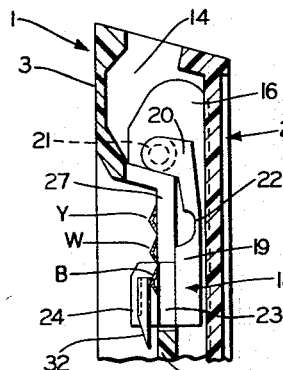
FIG. 5 is an enlarged, fragmentary sectional view through the upper portions of the body portion and lid, showing the terminals in the body portion, the flexible plastic slider member and the sliding contact carried thereby, showing the lid in closed position, the sliding contact contacting only one terminal, with the switch in "off" position.
Figure 6:
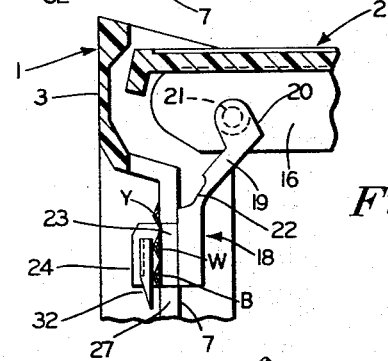
FIG. 6 is a view similar to FIG. 5, showing the lid in 90° open position, the sliding contact contacting the two lower terminals, closing the high speed switch.

As shown in FIG. 5, with the lid 2 in fully closed position, the sliding contact 32 contacts only the lower terminal B and the switch to the motor is "off." As the lid 2 is opened to about 90°, as shown in FIG. 6, the sliding contact 32 engages the terminals W and B closing the high speed switch to the motor.

Figure 7:
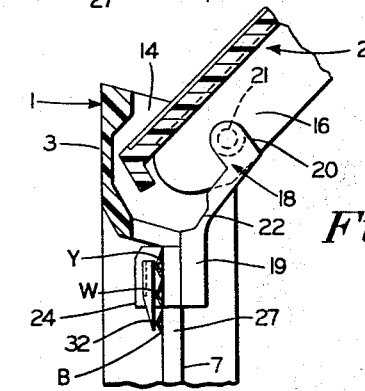
FIG. 7 is a similar view, showing the lid in 135° open position, the sliding contact contacting all three terminals, closing the low speed switch.
Figure 8:
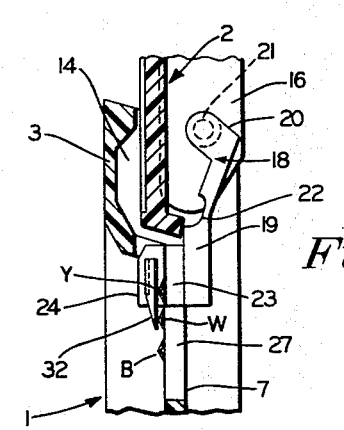
FIG. 8 is a similar view, showing the lid in 180° full open position, the sliding contact contacting the two upper terminals and the switch "off"

As the lid 2 is further opened to about 135° open position, as shown in FIG. 7, the sliding contact 32 engages the three terminals Y, W and B, closing the low speed switch. With the lid 2 moved to the 180° fully open position, as shown in FIG. 8, the sliding contact 32 contacts only the terminals Y and W, and the switch is "off."

It will be understood of course that this movement of the sliding contact 32 across the terminals Y, W and B does not affect the circuit to the push button 29, the night light 30 or the "Therm-O-Disc" 31.

From the above it will be obvious that the lid may be hingedly connected to the body portion of the inlet valve without requiring any additional hinge members of metal or other material, the hinge parts being molded integrally upon the body portion and lid of the valve.

It will also be obvious that this hinge construction holds the lid in any desired degree of open position. It will further be obvious that opening of the lid to various degrees will operate the motor either at high speed or low speed as desired and that full opening of the lid will shut off the motor so that the tubing of the vacuum cleaning system may be used as a speaking tube.

In the foregoing description certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

What is claimed is:

1. An inlet valve construction including a body portion and a lid, means hingedly connecting one edge portion of the lid to an adjacent edge portion of the body portion, a plurality of terminals on said body portion, an electric circuit connected to said terminals, a motor in said circuit, a sliding contact movable relative to said terminals and flexible means rigidly connected at one end to said sliding contact and pivotally connected at the other end to said lid, whereby movement of the lid to a predetermined partially open position will move the sliding contact into contact with certain of said terminals to operate the motor and movement of the lid to further open position will move the sliding contact to position to cut off the motor.

2. An inlet valve construction including a body portion and a lid, means hingedly connecting one edge portion of the lid to an adjacent edge portion of the body portion, a plurality of terminals on said body portion, an electric circuit connected to said terminals, a motor in said circuit, a sliding contact movable relative to said terminals and flexible means rigidly connected at one end to said sliding contact and pivotally connected at the other end to said lid, whereby movement of the lid to a predetermined partially open position will move the sliding contact into contact with certain of said terminals to operate the motor at high speed, and movement of the lid to further open position will move the sliding contact to position to operate the motor at low speed, and movement of the lid to full open position will move the sliding contact to position to cut off the motor.

3,283,093

3. An inlet valve construction including a body portion and a lid, means hingedly connecting one edge portion of the lid to an adjacent edge portion of the body portion, a plurality of terminals on said body portion, an electric circuit connected to said terminals, a motor in said circuit, a sliding contact movable relative to said terminals and flexible means rigidly connected at one end to said sliding contact and pivotally connected at the other end to said lid, whereby movement of the lid to a 90° open position will move the sliding contact into contact with certain of said terminals to operate the motor at high speed, and movement of the lid to a 135° open position will move the sliding contact to position to operate the motor at low speed, and movement of the lid to 180° full open position will move the sliding contact to position to cut off the motor.

4. An inlet valve construction including a body portion and a lid formed of resilient plastic material, upwardly diverging arms at opposite edges of the lid, similar interengaging circular series of radially disposed ratchet teeth upon the upper ends of said arms and at opposite edges of the body portion, forming hinges for hingedly mounting the lid upon the body portion and holding the lid in desired adjusted positions, a plurality of terminals on said body portion, an electric circuit connected to said terminals, a motor in said circuit, a sliding contact movable relative to said terminals and means operatively connecting said sliding contact to said lid, whereby movement of the lid to a predetermined partially open position will move the sliding contact into contact with certain of said terminals to operate the motor and movement of the lid to further open position will move the sliding contact to position to cut off the motor.

5. An inlet valve construction including a body portion and a lid formed of resilient plastic material, upwardly diverging arms at opposite edges of the lid, similar interengaging circular series of radially disposed ratchet teeth upon the upper ends of said arms, and at opposite edges of the body portion, forming hinges for hingedly mounting the lid upon the body portion and holding the lid in desired adjusted positions, a plurality of terminals on said body portion, an electric circuit connected to said terminals, a motor in said circuit, a sliding contact movable relative to said terminals and means operatively connecting said sliding contact to said lid, whereby movement of the lid to a predetermined partially open position will move the sliding contact into contact with certain of said terminals to operate the motor at high speed, and movement of the lid to further open position will move the sliding contact to position to operate the motor at low speed, and movement of the lid to full open position will move the sliding contact to position to cut off the motor.

6. An inlet valve construction including a body portion and a lid formed of resilient plastic material, upwardly diverging arms at opposite edges of the lid, similar interengaging circular series of radially disposed ratchet teeth upon the upper ends of said arms and at opposite edges of the body portion, forming hinges for hingedly mounting the lid upon the body portion and holding the lid in desired adjusted positions, a plurality of terminals on said body portion, an electric circuit connected to said terminals, a motor in said circuit, a sliding contact movable relative to said terminals and means operatively connecting said sliding contact to said lid, whereby movement of the lid to 90° open position will move the sliding contact into contact with certain of said terminals to operate the motor at high speed, and movement of the lid to a 135° open position will move the sliding contact to position to operate the motor at low speed, and movement of the lid to 180° full open position will move the sliding contact to position to cut off the motor.

7. An inlet valve construction including a body portion and a lid, means hingedly connecting one edge portion of the lid to an adjacent edge portion of the body portion, a plurality of terminals on said body portion, an electric circuit connected to said terminals, a motor in said circuit, a sliding contact movable relative to said terminals and a flexible slider having one end pivotally connected to said lid and having a reduced neck slidable in a slot in said body portion and a head upon said reduced neck, said sliding contact being carried by said head, whereby movement of the lid to a predetermined partially open position will move the sliding contact into contact with certain of said terminals to operate the motor and movement of the lid to further open position will move the sliding contact to position to cut off the motor.

8. An inlet valve construction including a body portion and a lid, means hingedly connecting one edge portion of the lid to an adjacent edge portion of the body portion, a plurality of terminals on said body portion, an electric circuit connected to said terminals, a motor in said circuit, a sliding contact movable relative to said terminals, a flexible slider having one end pivotally connected to said lid and having a reduced neck slidable in a slot in said body portion and a head upon said reduced neck, said sliding contact being carried by said head, whereby movement of the lid to a predetermined partially open position will move the sliding contact into contact with certain of said terminals to operate the motor at high speed, and movement of the lid to further open position will move the sliding contact to position to operate the motor at low speed, and movement of the lid to full open position will move the sliding contact to position to cut off the motor.

9. An inlet valve construction including a body portion and a lid, means hingedly connecting one edge portion of the lid to an adjacent edge portion of the body portion, a plurality of terminals on said body portion, an electric circuit connected to said terminals, a motor in said circuit, a sliding contact movable relative to said terminals, a flexible slider having one end pivotally connected to said lid and having a reduced neck slidable in a slot in said body portion and a head upon said reduced neck, said sliding contact being carried by said head, whereby movement of the lid to a 90° open position will move the sliding contact into contact with certain of said terminals to operate the motor at high speed, and movement of the lid to a 135° open position will move the sliding contact to position to operate the motor at low speed, and movement of the lid to 180° full open position will move the sliding contact to position to cut off the motor.

10. An inlet valve construction including a body portion and a lid formed of resilient plastic material, upwardly diverging arms at opposite edges of the lid, similar interengaging circular series of radially disposed ratchet teeth upon the upper ends of said arms and at opposite edges of the body portion, forming hinges for hingedly mounting the lid upon the body portion and holding the lid in desired adjusted positions, a plurality of terminals on said body portion, an electric circuit connected to said terminals, a motor in said circuit, a sliding contact movable relative to said terminals and a flexible slider having one end pivotally connected to said lid and having a reduced neck slidable in a slot in said body portion and a head upon said reduced neck, said sliding contact being carried by said head, whereby movement of the lid to a predetermined partially open position will move the sliding contact into contact with certain of said terminals to operate the motor and movement of the lid to further open position will move the sliding contact to position to cut off the motor.

11. An inlet valve construction including a body portion and a lid formed of resilient plastic material, upwardly diverging arms at opposite edges of the lid, similar interengaging circular series of radially disposed ratchet teeth upon the upper ends of said arms, and at opposite edges of the body portion, forming hinges for hingedly mounting the lid upon the body portion and holding the lid in desired adjusted positions, a plurality of terminals on said body portion, an electric circuit connected to said terminals, a motor in said circuit, a sliding contact movable relative to said terminals and a flexible slider having one end pivotally connected to said lid and having a reduced neck slidable in a slot in said body portion and a head upon said reduced neck, said sliding contact being carried by said head, whereby movement of the lid to a predetermined partially open position will move the sliding contact into contact with certain of said terminals to operate the motor at high speed, and movement of the lid to further open position will move the sliding contact to position to operate the motor at low speed, and movement of the lid to full open position will move the sliding contact to position to cut off the motor.

12. An inlet valve construction including a body portion and a lid formed of resilient plastic material, upwardly diverging arms at opposite edges of the lid, similar interengaging circular series of radially disposed ratchet teeth upon the upper ends of said arms, and at opposite edges of the body portion, forming hinges for hingedly mounting the lid upon the body portion and holding the lid in desired adjusted positions, a plurality of terminals on said body portion, an electric circuit connected to said terminals, a motor in said circuit, a sliding contact movable relative to said terminals and a flexible slider having one end pivotally connected to said lid and having a reduced neck slidable in a slot in said body portion and a head upon said reduced neck, said sliding contact being carried by said head, whereby movement of the lid to a 90° open position will move the sliding contact into contact with certain of said terminals to operate the motor at high speed, and movement of the lid to a 135° open position will move the sliding contact to position to operate the motor at low speed, and movement of the lid to 180° full open position will move the sliding contact to position to cut off the motor.

13. An inlet valve construction as defined in claim 1, in which each terminal is riveted intermediate its ends upon a raised portion of the wall of the body portion and has an upwardly curved end portion engaged under an overhanging flange on said wall and having a downwardly disposed barb thereon for biting into a bare wire and clamping it against the adjacent portion of the wall.

References Cited by the Examiner
UNITED STATES PATENTS

| | | | |
|---|---|---|---|
| 620,401 | 2/1899 | Almonte | 16—140 |
| 784,104 | 3/1905 | Caley | 16—140 |
| 1,174,142 | 3/1916 | Harris | 200—61.62 |
| 1,582,064 | 4/1926 | Maddox | 200—61.62 |
| 1,618,667 | 2/1927 | Melcher | 200—61.6 |
| 1,864,539 | 6/1932 | Hauser | 220—32 |
| 2,490,746 | 12/1949 | Carpenter | 220—32 |
| 2,617,844 | 11/1952 | Sanda. | |
| 3,076,068 | 1/1963 | Racklyeft | 200—61.6 |

BERNARD A. GILHEANY, *Primary Examiner.*

J. J. BAKER, *Assistant Examiner.*